(12) United States Patent
Ostergaard et al.

(10) Patent No.: US 10,179,439 B2
(45) Date of Patent: Jan. 15, 2019

(54) WIND TURBINE BLADE PART MANUFACTURED IN TWO STEPS

(71) Applicant: LM WP PATENT HOLDING A/S, Kolding (DK)

(72) Inventors: Rasmus C Ostergaard, Copenhagen (DK); Lars Nielsen, Skanderborg (DK); Klavs Jespersen, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 148 days.

(21) Appl. No.: 15/113,157

(22) PCT Filed: Jan. 30, 2015

(86) PCT No.: PCT/EP2015/051944
§ 371 (c)(1),
(2) Date: Jul. 21, 2016

(87) PCT Pub. No.: WO2015/114098
PCT Pub. Date: Aug. 6, 2015

(65) Prior Publication Data
US 2017/0001387 A1    Jan. 5, 2017

(30) Foreign Application Priority Data
Jan. 31, 2014   (EP) ..................... 14153437

(51) Int. Cl.
| | | |
|---|---|---|
| *B29C 70/68* | (2006.01) | |
| *B29C 70/34* | (2006.01) | |
| *B29C 70/44* | (2006.01) | |
| *B29D 99/00* | (2010.01) | |
| *F03D 1/06* | (2006.01) | |
| *B29C 70/48* | (2006.01) | |

(Continued)

(52) U.S. Cl.
CPC ............ *B29C 70/68* (2013.01); *B29C 70/342* (2013.01); *B29C 70/443* (2013.01); *B29C 70/48* (2013.01); *B29D 99/0025* (2013.01); *F03D 1/065* (2013.01); *B29K 2031/00* (2013.01); *B29K 2105/08* (2013.01); *B29K 2307/04* (2013.01); *B29K 2309/08* (2013.01); *B29L 2031/085* (2013.01); *Y02E 10/721* (2013.01); *Y02P 70/523* (2015.11)

(58) Field of Classification Search
None
See application file for complete search history.

(56) References Cited

U.S. PATENT DOCUMENTS

2012/0009070 A1 *  1/2012  Bech ................... F03D 1/065
                                                          416/230

* cited by examiner

*Primary Examiner* — Monica A Huson
(74) *Attorney, Agent, or Firm* — Nath, Goldberg & Meyer; Jerald L. Meyer; Tanya E. Harkins

(57) ABSTRACT

A method of manufacturing a portion of a wind turbine blade is described. The method comprising the steps of: laying up a primary fiber material in a mold; infusing said primary fiber material with a primary resin; substantially curing said primary resin in said primary fiber material to form a cured blade element; laying up a secondary fiber material on top of at least a portion of said cured blade element; infusing said secondary fiber material with a secondary resin different to said primary resin, wherein said secondary resin has a higher strength level than said primary resin; and curing said secondary resin in said secondary fiber material to form an integrated reinforced section on said cured blade element.

14 Claims, 7 Drawing Sheets

Figure 1:
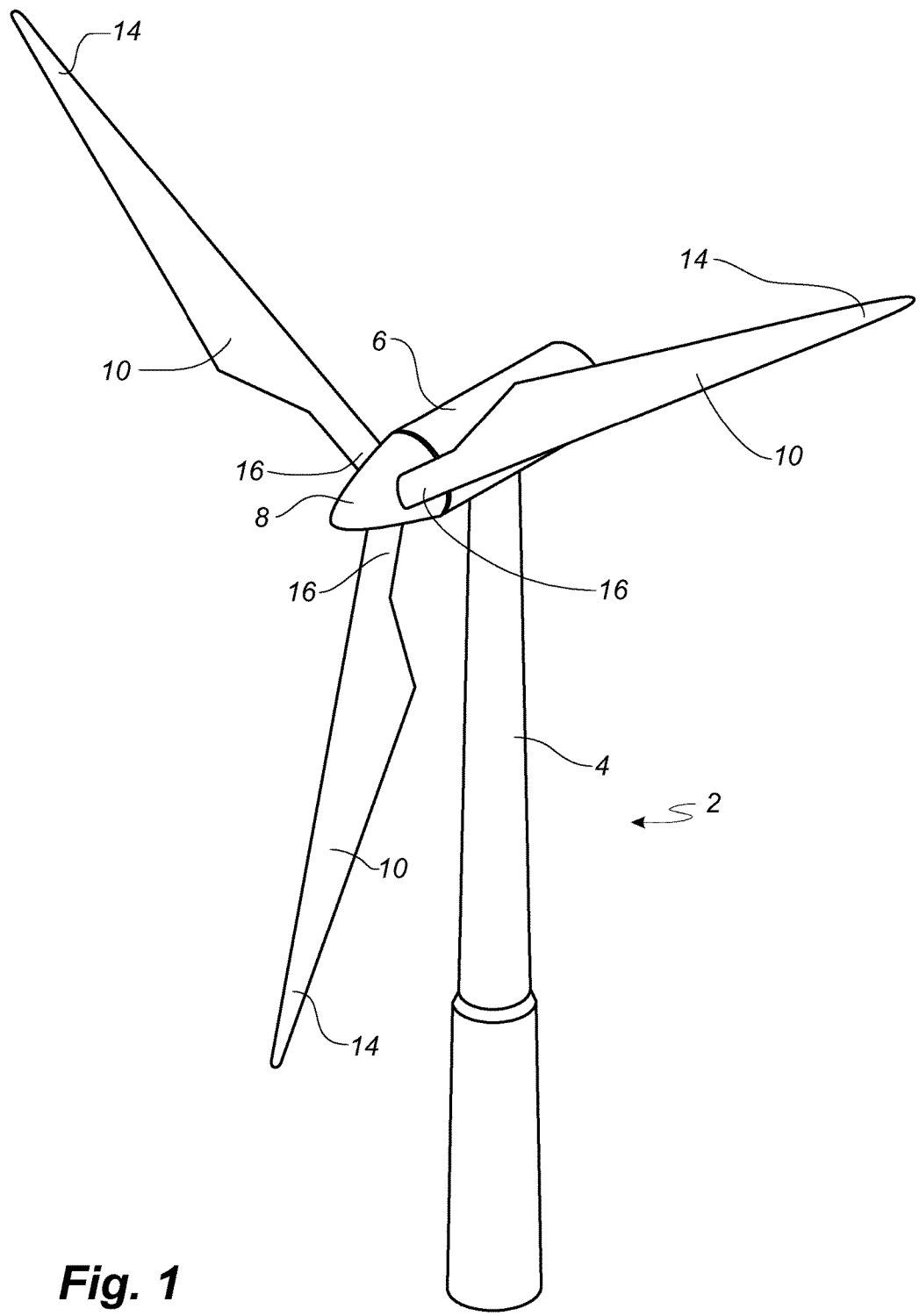

(51) Int. Cl.
*B29L 31/08* (2006.01)
*B29K 31/00* (2006.01)
*B29K 105/08* (2006.01)
*B29K 307/04* (2006.01)
*B29K 309/08* (2006.01)

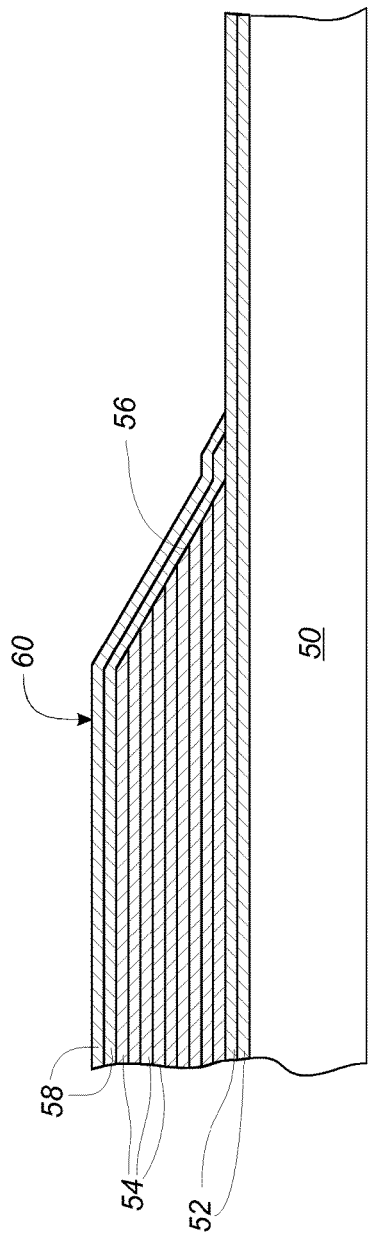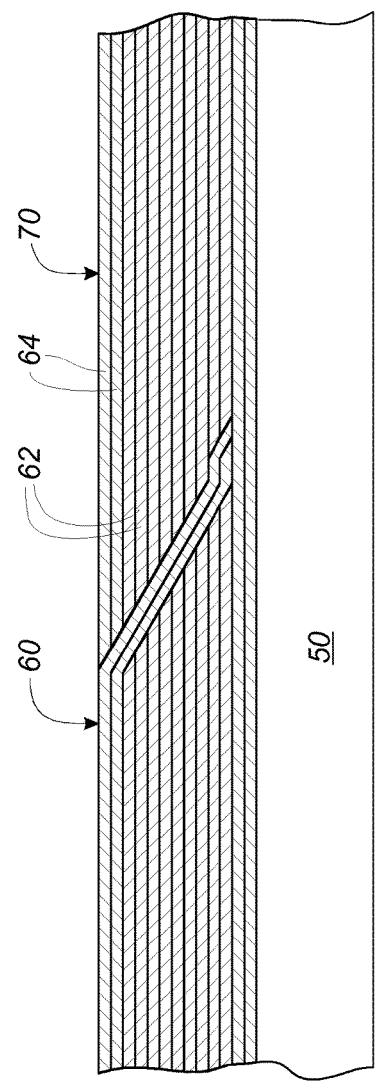

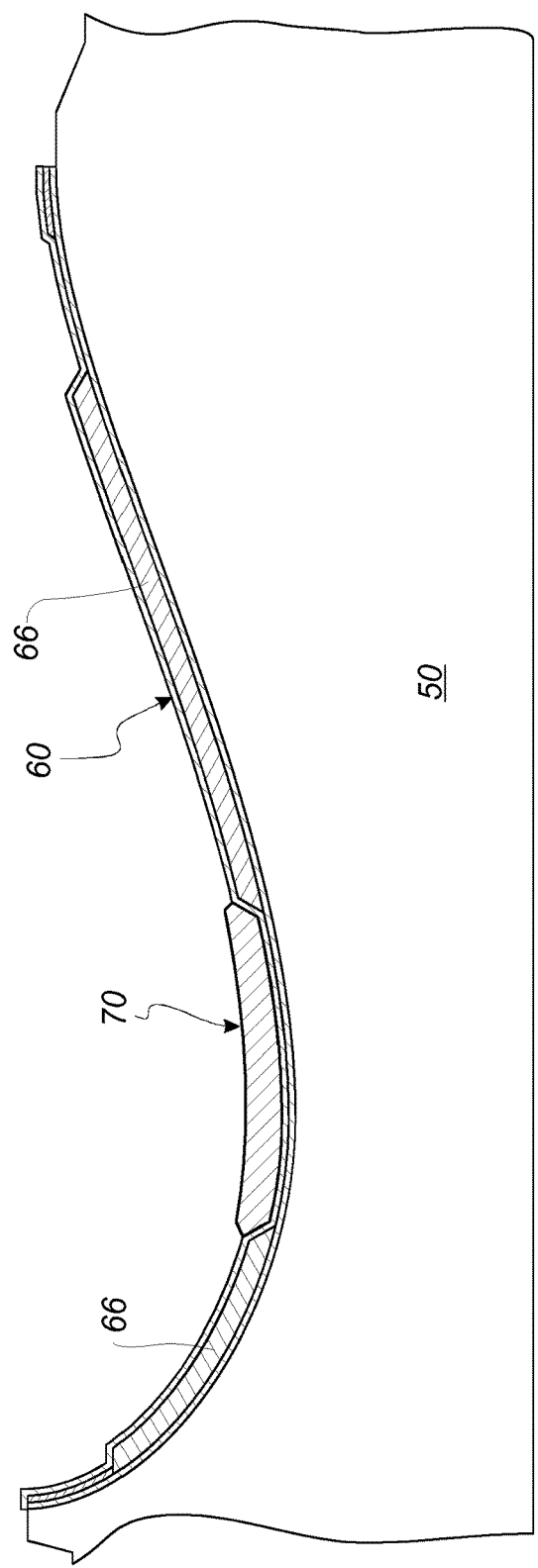

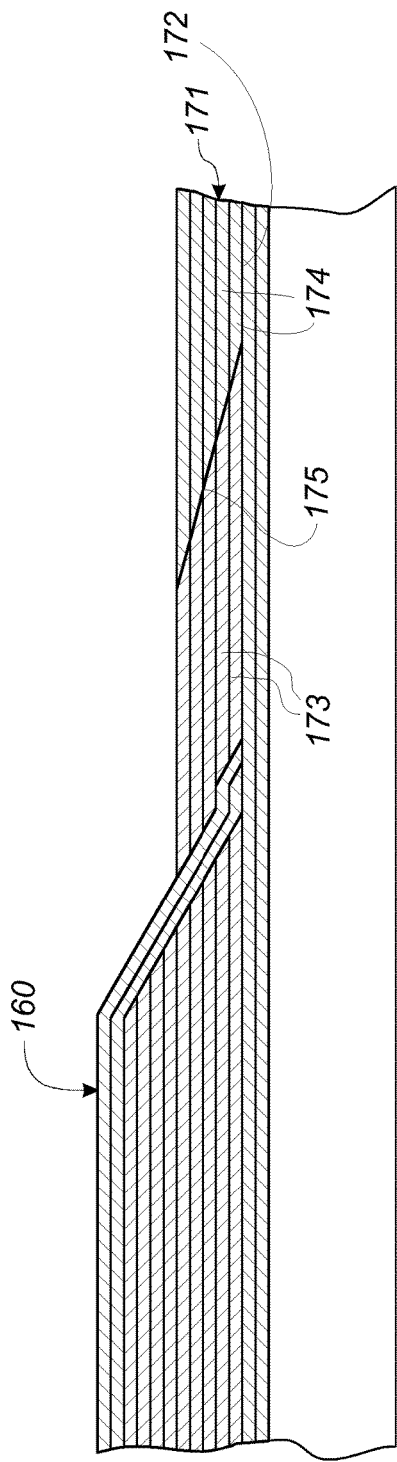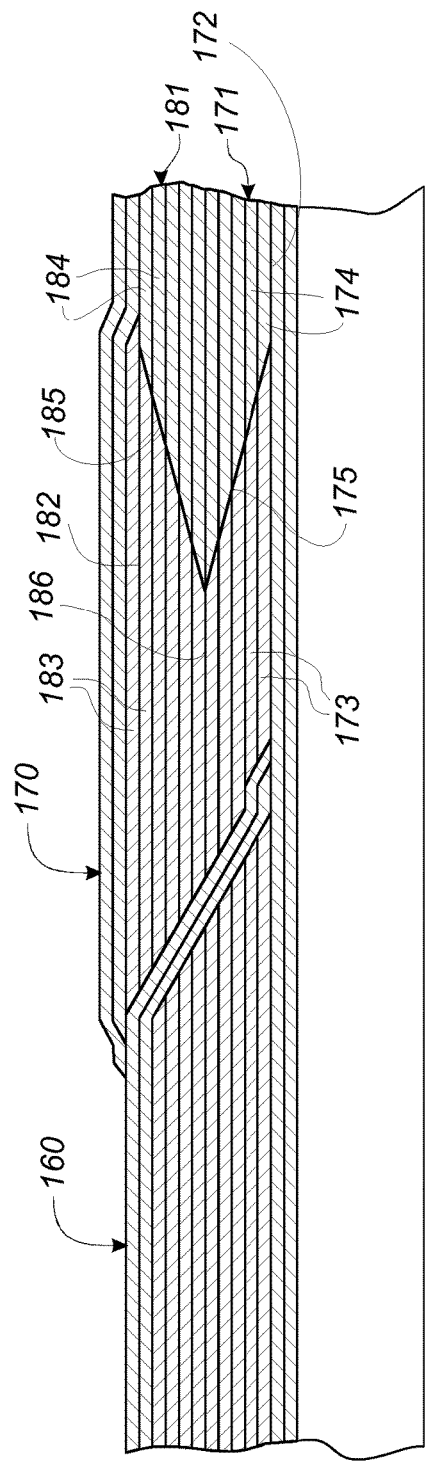

WIND TURBINE BLADE PART MANUFACTURED IN TWO STEPS

This is a National Phase Application filed under 35 U.S.C. 371 as a national stage of PCT/EP2015/051944, filed Jan. 30, 2015, an application claiming the benefit of European Application No. 14153437.0, filed Jan. 31, 2014, the content of each of which is hereby incorporated by reference in its entirety.

FIELD OF THE INVENTION

The present invention relates to a method of manufacturing a wind turbine blade and intermediate products of a wind turbine blade. The invention further relates to a wind turbine blade and intermediate products of the wind turbine blade.

BACKGROUND OF THE INVENTION

Wind turbine blades are often manufactured according to one of two constructional designs, namely a design where a thin aerodynamic shell is glued onto a spar beam, or a design where spar caps, also called main laminates, are integrated into the aerodynamic shell.

In the first design, the spar beam constitutes the load bearing structure of the blade. The spar beam as well as the aerodynamic shell or shell parts are manufactured separately. The aerodynamic shell is often manufactured as two shell parts, typically as a pressure side shell part and a suction side shell part. The two shell parts are glued or otherwise connected to the spar beam and are further glued to each other along a leading edge and trailing edge of the shell parts. This design has the advantage that the critical load carrying structure may be manufactured separately and therefore easier to control. Further, this design allows for various different manufacturing methods for producing the beam, such as moulding and filament winding.

In the second design, the spar caps or main laminates are integrated into the shell and are moulded together with the aerodynamic shell. The main laminates typically comprise a high number of fibre layers compared to the remainder of the blade and may form a local thickening of the wind turbine shell, at least with respect to the number of fibre layers. Thus, the main laminate may form a fibre insertion in the blade. In this design, the main laminates constitute the load carrying structure. The blade shells are typically designed with a first main laminate integrated in the pressure side shell part and a second main laminate integrated in the suction side shell part. The first main laminate and the second main laminate are typically connected via one or more shear webs, which for instance may be C-shaped or I-shaped. For very long blades, the blade shells further along at least a part of the longitudinal extent comprise an additional first main laminate in the pressure side shell, and an additional second main laminate in the suction side shell. These additional main laminates may also be connected via one or more shear webs. This design has the advantage that it is easier to control the aerodynamic shape of the blade via the moulding of the blade shell part.

Vacuum infusion or VARTM (vacuum assisted resin transfer moulding) is one method, which is typically employed for manufacturing composite structures, such as wind turbine blades comprising a fibre reinforced matrix material.

During the process of filling the mould, a vacuum, said vacuum in this connection being understood as an underpressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus, it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to remove by controlling the vacuum pressure and a possible overpressure at the inlet side. In vacuum infusion techniques employing a rigid mould part and a resilient mould part in the form of a vacuum bag, the dry spots can be repaired after the process of filling the mould by puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

In most cases the polymer or resin applied is polyester, vinyl ester or epoxy, but may also be PUR or pDCPD, and the fibre reinforcement is most often based on glass fibres or carbon fibres. Epoxies have advantages with respect to various properties, such as shrinkage during curing (which in some circumstances may lead to less wrinkles in the laminate), electrical properties and mechanical and fatigue strengths. Polyester and vinyl esters have the advantage that they provide better bonding properties to gelcoats.

Thereby, a gelcoat may be applied to the outer surface of the shell during the manufacturing of the shell by applying a gelcoat to the mould before fibre-reinforcement material is arranged in the mould. Thus, various post-moulding operations, such as painting the blade, may be avoided. Further, polyesters and vinyl esters are cheaper than epoxies. Consequently, the manufacturing process may be simplified and costs may be lowered.

Often the composite structures comprise a core material covered with a fibre reinforced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

As for instance blades for wind turbines have become bigger and bigger in the course of time and may now be more than 70 meters long, the impregnation time in connection with manufacturing such blades has increased, as more fibre material has to be impregnated with polymer. Furthermore the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result the polymer has to stay liquid for a longer time, normally also resulting in an increase in the curing time.

Resin transfer moulding (RTM) is a manufacturing method, which is similar to VARTM. In RTM the liquid resin is not drawn into the mould cavity due to a vacuum generated in the mould cavity. Instead the liquid resin is forced into the mould cavity via an overpressure at the inlet side.

Prepreg moulding is a method in which reinforcement fibres are pre-impregnated with a pre-catalysed resin. The resin is typically solid or near-solid at room temperature. The prepregs are arranged by hand or machine onto a mould surface, vacuum bagged and then heated to a temperature, where the resin is allowed to reflow and eventually cured. This method has the main advantage that the resin content in the fibre material is accurately set beforehand. The prepregs are easy and clean to work with and make automation and labour saving feasible. The disadvantage with prepregs is that the material cost is higher than for non-impregnated fibres. Further, the core material need to be made of a material, which is able to withstand the process temperatures needed for bringing the resin to reflow. Prepreg moulding may be used both in connection with a RTM and a VARTM process.

Further, it is possible to manufacture hollow mouldings in one piece by use of outer mould parts and a mould core. Such a method is for instance described in EP 1 310 351 and may readily be combined with RTM, VARTM and prepreg moulding.

Further, it is known to manufacture blades with two or more different types of fibre material. WO 2003/078832 discloses a wind turbine blade of fibre-reinforced polymer including a first type of fibres, such as glass fibres, of a first stiffness and a second type of fibres, such as carbon fibres, of a different stiffness. In a transition region between the two types of fibres the quantitative ratio of the two types of fibres varies continuously in the longitudinal direction of the blade. In a described preferred embodiment, the laminate comprises a plurality of layers, and the boundaries between layers having the first types of fibres and layers having the second types of fibres are mutually shifted in the longitudinal direction of the blade so that a step tapered transition is achieved. However, it has been found that such a transition is not mechanically strong. In order to compensate for stress concentrations when using reinforcement fibres with differing E modulus in composites, it is possible to provide a local thickening in the transition area between the two different fibres and thereby limit the risk of failure due to stress concentrations. One drawback of such a solution is, however, increased weight due to the increased use of fibres, e.g. glass fibres, in the transition area between glass fibres and carbon fibres.

US 2012/0009070 discloses a method of preparing a wind turbine blade shell member by use of pre-cured fibre-reinforced sheet material. In one embodiment, a step infusion process is described, where individual layers are infused in sequence.

WO 2012/149939 discloses a method of preparing a hybrid composite laminate of layers of fibre reinforced material of different resin viscosities, where first layers are pre-impregnated with a first resin having a first viscosity, and second layers are impregnated with a resin of a second viscosity.

WO 2013/010979 discloses a wind turbine blade having different types of fibres with a scarf-like transition between the different fibre types.

US 2012/0082558 discloses a modular wind turbine blade, where parts are bonded to each other along bond lines. In one embodiment, bond lines are formed as double scarf joints.

Additionally, it is known from WO 2013/113817 to manufacture a blade shell part in a mould system and transferring the cured blade shell parts to a post-moulding station comprising cradles for carrying the cured shell parts for additional treatment, such as gluing the shell parts together to form the aerodynamic shell of a finished wind turbine blade. The method ensures that the mould cycle time is kept as short as possible allowing for maximum effective mould usage. The method is particular suitable for blades having a length of 40 to 50 meters, since the layup process for such length blades approximately takes one third of the total production time, which comprises layup, infusion, and post-moulding assembly and other post-moulding operations. This allows for a continuous manufacturing process, where the mould system and post-moulding system is utilised at all times. However, for longer blades, such as blades having a length of 60 to 80 meters or even more, the layup time takes up a much larger part of the total production time, whereby the post-moulding system has a lot of idle time.

It is an object of the invention to obtain partly a new blade design and intermediary products of this design as well as a new method for manufacturing such wind turbine blades and intermediary products, and which overcomes or ameliorates at least one of the disadvantages of the prior art or which provides a useful alternative.

SUMMARY OF THE INVENTION

According to one aspect, the invention provides a wind turbine blade having a longitudinal direction between a root end and a tip end, wherein the wind turbine blade comprises at least a wind turbine blade component made of fibrous composite material and comprising a first type of reinforcement fibres having a first elastic modulus, and a second type of reinforcement fibres and a second elastic modulus, wherein the wind turbine blade component comprises a thickness between a first surface and a second surface, wherein the proportion between the first type of reinforcement fibres and the second type of reinforcement fibres gradually changes in a first direction of the wind turbine blade so that the elastic modulus gradually changes in said first direction, wherein said gradual change in the first direction is provided by: a first thickness section, where the first type reinforcement fibres along a first common boundary are tapered towards the first surface of the wind turbine blade component in the first direction, and the second type reinforcement fibres are tapered towards the second surface of the wind turbine blade component in a direction opposite the first direction, and a second thickness section, where the first type reinforcement fibres along a second common boundary are tapered towards the second surface of the wind turbine component in the first direction, and the second type reinforcement fibres are tapered towards the first surface of the wind turbine component in a direction opposite the first direction, and wherein the first type of fibres and the second type of fibres are embedded in a common polymer matrix.

Accordingly, it is seen that the gradual transition is provided by a combined double-tapered thickness section with first type reinforcement fibres sandwiched between second type reinforcement fibres or vice versa. Although this increases the complexity of the fibre layup procedure, this embodiment provides a stronger stiffness transition of the wind turbine component between the two fibre types, and further the transition may be shorter than prior art wind turbine components having a single taper section. Further, it is clear that the double-tapering is provided during layup and that the reinforcement material is impregnated with a polymer resin and then cured or hardened so that the two types of reinforcement fibres are embedded in a common polymer matrix. This has the advantage of lowering stress concentrations and in particular the energy release rate at the common boundary between the two types of fibre, especially compared to parts joined at a bond line.

Advantageously, the first common boundary and the second common boundary are converging in the first direction or in a direction opposite the first direction, more advantageously in the direction opposite the first direction.

Preferably, the first direction is the longitudinal direction of the blade. Accordingly, it is seen that the gradual stiffness transition is provided in the longitudinal direction of the blade. Typically, the fibre type with the highest E-modulus is arranged outboard nearest the tip, and the fibre type with the lowest E-modulus is arranged inboard nearest the root. However, in embodiments employing a transition from glass fibres to carbon fibres, the tip end may be reinforced with glass fibres only for lightning protection reasons. Accordingly, the blade may have a second transition from carbon fibres to glass fibres near the tip end.

According to an advantageous embodiment, the first thickness section and the second thickness section have a common surface boundary between the first surface and the second surface of the wind turbine blade component. Thus, it is seen that the two thickness sections are layered on top of each other.

Advantageously, the taper sections of the first thickness section and the second thickness coincide at the common surface boundary. In other words the two taper sections formed by the two common boundaries converge at a common apex point.

In one embodiment, the first thickness section and/or the second thickness section comprises a stepped tapering between layers comprising the first type reinforcement fibres and the second type reinforcement fibres. Accordingly, it is seen that the gradual transition via the layup procedure is provided as a double lap joint like transition between the two types of fibres.

However, in a second preferred embodiment, the first thickness section and/or the second thickness section comprises a continuous tapering between layers comprising the first type reinforcement fibres and the second type reinforcement fibres. Accordingly, it is seen that the gradual transition via the layup procedure is provided as a double scarf joint like transition between the two types of fibres. Further, it is clear that the individual layers comprising fibres need to be tapered at end sections thereof.

Preferably, the wind turbine component is a load carrying structure, such as a spar or a spar cap.

According to an advantageous embodiment, the first type reinforcement fibres are glass fibres. The second type reinforcement fibres may for instance be carbon fibres or a hybrid of carbon fibres and glass fibres.

In one embodiment, the wind turbine blade component comprises a first section, wherein the fibrous composite material is mainly reinforced by the first type reinforcement fibres, and a second section, wherein the fibrous composite material is mainly reinforced by the second type reinforcement fibres, and wherein the gradual change is arranged between the first section and the second section.

The first type reinforcement fibres and second type reinforcement fibres are preferably arranged so that the first type reinforcement fibres are located nearest the root end of the wind turbine blade and the second type reinforcement fibres are located nearest the tip end of the blade, and so that the elastic modulus increases towards the tip.

In another advantageous embodiment, the wind turbine blade further comprises a gradual transition comprising a taper section between the first type reinforcement fibres and a third type reinforcement fibres embedded in an additional polymer matrix, different from the common polymer matrix. The third type reinforcement may for instance be glass fibres.

The common polymer matrix may advantageously be a hardened or cured vinylester or epoxy. The additional polymer matrix may a hardened or cured polyester. Accordingly, it is possible to pre-manufacture a first part with lower strength and stiffness using cheaper material, and manufacturing the load carrying part with stiffer fibres and stronger matrix.

Advantageously, the component comprising the third type reinforcement fibres embedded in the additional polymer matrix comprises a root end laminate. Accordingly, the transition to the first type fibres may be established between the root end laminate and the spar cap of the wind turbine blade. The component comprising the third type fibres may further comprise an aerodynamic shell part of the wind turbine blade. The spar cap may be adhered, e.g. via the common polymer matrix, to the aerodynamic shell.

In the same one aspect, the invention also provides a method of manufacturing a wind turbine blade component of a wind turbine blade having a longitudinal direction between a root end and a tip end, wherein the wind turbine blade component comprises a thickness between a first surface and a second surface, wherein the method comprises the steps of:
  a) building up a first thickness section by:
    i) arranging a number of first fibre layers comprising reinforcement fibres of a first type, and
    ii) arranging a number of second fibre layers comprising reinforcement fibres of a second type, wherein
      the first layers and second layers are arranged so that
        the first fibre layers along a first common boundary are tapered towards the first surface of the wind turbine blade component in a first direction, and the second fibre layers are tapered towards the second surface of the wind turbine blade component in a direction opposite the first direction, and
  b) building up a second thickness section by:
    i) arranging a number of additional first fibre layers comprising reinforcement fibres of the first type, and
    ii) arranging a number of additional second fibre layers comprising reinforcement fibres of the second type, wherein
      the first additional fibre layers and second additional fibre layers are arranged so that the additional first fibre layers along a second common boundary are tapered towards the second surface of the wind turbine blade component in the first direction, and the additional second fibre layers are tapered towards the first surface of the wind turbine blade component in a direction opposite the first direction, and
  c) supplying a common polymer resin to the first thickness section and second thickness section, and
  d) curing or hardening the common polymer resin so as to embed the first type reinforcement fibres and the second type reinforcement fibres in a common polymer matrix.

Accordingly, a gradual transition is provided by a double-tapering with first type reinforcement fibres sandwiched between second type reinforcement fibres or vice versa. Although this increases the complexity of the fibre layup procedure, this embodiment provides a stronger stiffness transition of the wind turbine component, since the two reinforcement fibre types and the boundary between the fibres are embedded in the same polymer matrix. Further, the transition may be shorter than prior art wind turbine components having a single taper section.

The polymer resin may be supplied simultaneously with steps a) and b), e.g. via prepregs. However, advantageously, the fibre layers are arranged in dry form and a liquid resin is supplied afterwards. The resin may for instance be injected via a VARTM method.

Preferably, the first thickness section comprises a plurality of fibre layers, wherein the first common boundary is formed by boundaries between first fibre layers and second fibre layers are mutually shifted in the first direction of the wind turbine blade.

Similarly, the second thickness section may comprise a plurality of additional fibre layers, wherein the second common boundary is formed by boundaries between additional first fibre layers and additional second fibre layers are mutually shifted in the first direction of the wind turbine blade.

Advantageously, the ends of the plurality of fibre layers are tapered at the common boundary. Accordingly, the common boundary is provided as a continuous tapering, which provides the strongest transition. Thus, the first fibre layers and the second fibre layers may form a common boundary corresponding to a double scarf joint. In an alternative embodiment, the ends of the plurality of layers are non-tapered. Accordingly, the taper sections form lap joints, preferably a double lap joint.

According to another aspect, the invention provides a method of manufacturing a portion of a wind turbine blade, the method comprising the steps of:
- laying up a primary fibre material in a mould;
- infusing said primary fibre material with a primary resin;
- substantially curing said primary resin in said primary fibre material to form a cured blade element;
- laying up a secondary fibre material on top of at least a portion of said cured blade element;
- infusing said secondary fibre material with a secondary resin different to said primary resin, wherein said secondary resin has a higher strength level than said primary resin; and
- curing said secondary resin in said secondary fibre material to form an integrated reinforced section on said cured blade element.

Thus, it is seen that the cured blade part may be manufactured first with a primary fibre material and relatively low strength matrix material and thus according to relative low cost production method, whereas the critical integrated reinforcement section may be subsequently arranged with secondary fibre material and a higher strength matrix material. Further, the production of the cured blade part may be manufactured with a special shape, e.g. with a recess, so that the secondary fibre material may more easily be arranged without wrinkling. The strength level preferably refers to the tensile strength.

It is noted that the two aspects of the invention use slightly different terms. However, preferably the following applies:

| Aspect I | Aspect II |
|---|---|
| First type reinforcement fibres | Part of secondary fibre material |
| Second type reinforcement fibres | Part of secondary fibre material |
| Third type reinforcement fibres | Primary fibre material |
| Common polymer matrix | Secondary resin |
| Additional polymer matrix | Primary resin |

Advantageously, the cured blade element comprises an aerodynamic shell part of the blade. Further, the cured blade element may advantageously comprise a root end laminate. Advantageously, the integrated reinforced section forms at least a part of a spar cap or spar beam of the wind turbine.

Preferably, said primary resin comprises a relatively low-strength resin, e.g. polyester.

Preferably, said secondary resin comprises a relatively high-strength resin, e.g. vinylester, epoxy, polyurethane, a hybrid resin.

Preferably, said primary resin and/or said secondary resin comprise room-temperature-cured resins.

Preferably, said primary fibre material is different to said secondary fibre material.

Preferably, said secondary fibre material comprises fibres which have a greater stiffness level than fibres of said primary fibre material.

Preferably, said fibres of said secondary fibre material have an elastic modulus or stiffness level at least 20% higher than said fibres of said primary fibre material.

Preferably, said fibres of said primary fibre material have an elastic modulus of less than 50,000 MPa, and wherein said fibres of said secondary fibre material have an elastic modulus greater than 53,000 MPa, and more preferably greater than 60,000 MPa.

Preferably, said primary fibre material is a glass fibre material, e.g. E-glass, H-glass.

Preferably, said secondary fibre material is selected from one or more of the following: H-glass, carbon fibre, steel fibre.

It will be understood that the secondary fibre material may be provided as a hybrid of any combination of the relatively high stiffness materials. A carbon-glass hybrid may be particularly advantageous.

Preferably, the method comprises the step of, after laying up said primary fibre material, applying a primary vacuum bag over said primary fibre material, and wherein said step of infusing said primary fibre material with a primary resin comprises a vacuum infusion process. Thus, the cured blade part may be pre-manufactured in a first step using for instance Vacuum Assisted Resin Transfer Moulding (VARTM).

Preferably, the method comprises the step of, after curing said primary resin, removing said primary vacuum bag before laying up said secondary fibre material.

Preferably, the method comprises the step of, after laying up said secondary fibre material, applying a secondary vacuum bag over said secondary fibre material, and wherein said step of infusing said secondary fibre material with a secondary resin comprises a vacuum infusion process. Thus, the critical integrated reinforced section is subsequently manufactured via a corresponding moulding process.

Preferably, the method comprises the step of, after curing said secondary resin, removing said secondary vacuum bag.

Preferably, the method comprises the step of, after curing said primary resin in said primary fibre material to form a cured blade element, removing said cured blade element from said mould and transferring said cured blade element to a secondary support. Since the secondary fibre material is arranged on the cured blade part, it is not necessary that the blade part still occupies the mould. Instead, it is possible to move the cured blade part to the support and continue the layup process there. This may be particular relevant, if the cured blade part for instance forms part of the aerodynamic shell of the blade. Thus, the mould time may be reduced, which may increase the throughput from the manufacturing facility. This is particular relevant for relative long blades, e.g. blades having a blade length of at least 60 meters, since the layup procedure takes up a large part of the total manufacturing time. Accordingly, it is efficient, if some of the layup procedure and subsequent infusion can be moved to the secondary support.

The secondary support may comprise a secondary mould, a support table, a support cradle, a frame, etc., e.g. a post-moulding system as described in WO 2013/113817.

Preferably, said step of laying up said primary fibre material comprises arranging said primary fibre material in said mould to define a recess to receive a reinforcing section, and wherein said step of laying up said secondary fibre material comprises arranging said secondary fibre material in said recess. Thus, the secondary material may be arranged within said recess, which will simplify the layup procedure and ensure that a proper transition from the cured blade part to the integrally formed reinforcement section is obtained.

Preferably, said steps of laying up fibre material are arranged such that said cured blade element comprises at least a portion of a wind turbine blade shell, and said reinforced section on said cured blade element comprises a main laminate section of said wind turbine blade shell. Further, the cured blade element may comprise a root end laminate.

Preferably, the method comprises the step of treating a surface of said at least a portion of said cured blade element prior to said step of laying up said secondary fibre material, wherein said step of treating acts to increase the bonding between said reinforced section and said cured blade element after said step of curing said secondary resin. This may improve the mechanical bonding between the two parts.

Preferably, said step of treating comprises a surface grinding, a primer application, a peel ply application during infusion (to leave a surface pattern), and application of an adhesion layer (e.g. a fabric impregnated with a prepreg solution).

Additionally or alternatively, said step of laying up said secondary fibre material comprises arranging said secondary fibre material to form a structural flange of said cured blade element, e.g. an adhesive flange, wherein said step of curing said secondary fibre material forms a reinforced structural flange of said cured blade element.

Preferably, said step of laying up said secondary fibre material to form a structural flange comprises arranging said secondary fibre material wherein a primary side of said secondary fibre material is applied on top of at least a portion of said cured blade element, wherein a secondary end of said secondary fibre material lies free of said cured blade element.

According to said another aspect, the invention also provides a method of manufacturing a wind turbine blade:
providing a first blade element; and
providing a second blade element, wherein at least one of said first and second blade elements comprises a cured blade element comprising a reinforced section manufactured according to the above method, and
assembling said first and second blade elements to form a wind turbine blade.

Further, the invention also provides a portion of a wind turbine blade, preferably a wind turbine blade shell, manufactured according to the above method.

Finally, the invention provides a wind turbine having at least one wind turbine blade manufactured according to the above method.

It is clear that the invention is particularly suited for large structures. Accordingly, the invention preferably relates to wind turbine blades as well as intermediary structures having a total length of at least 30 meters, 40 meters, 45 meters, 50 meters, 55 meters, or 60 meters.

DETAILED DESCRIPTION OF THE INVENTION

Figure 2:
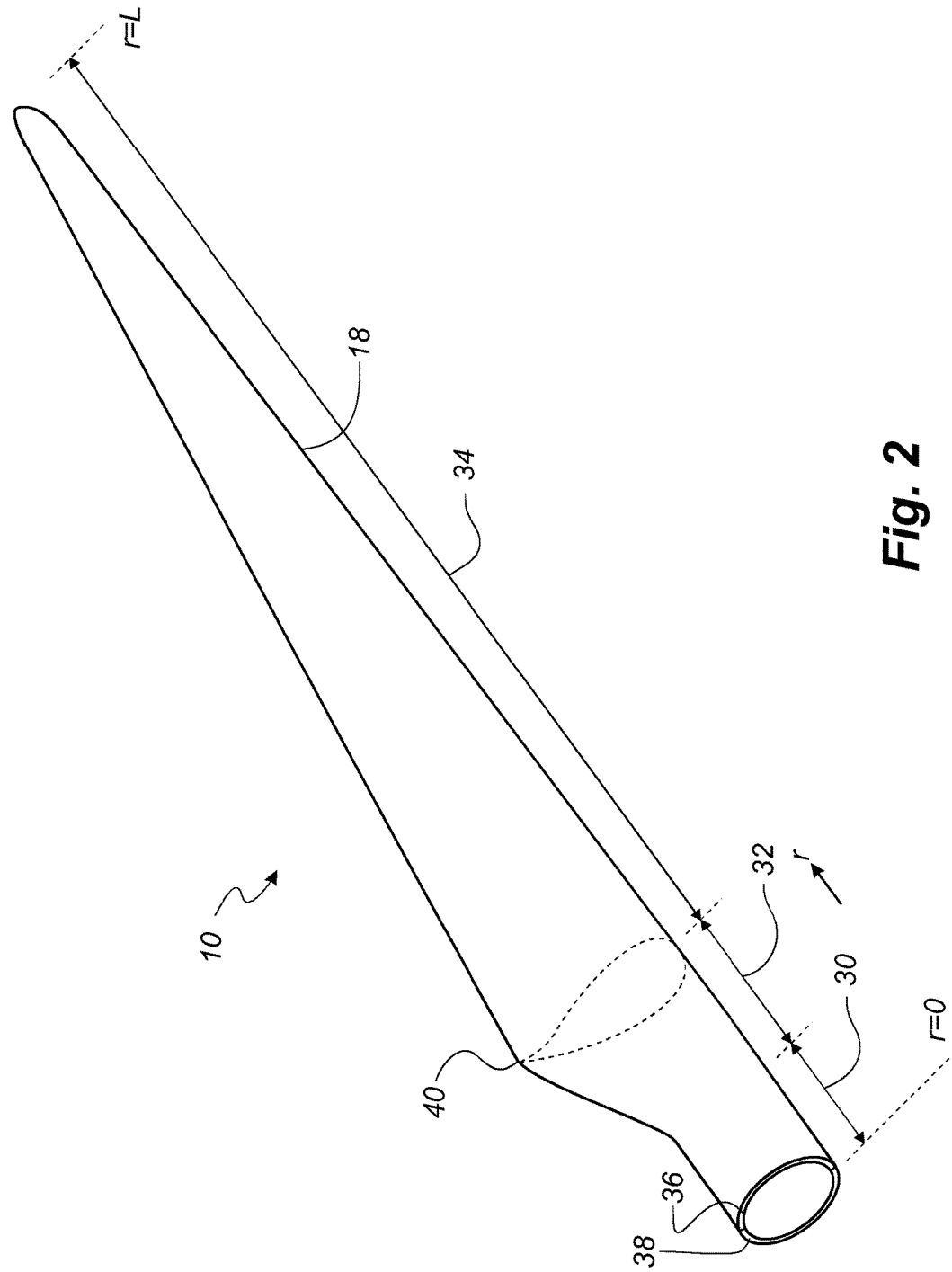
Figure 6:
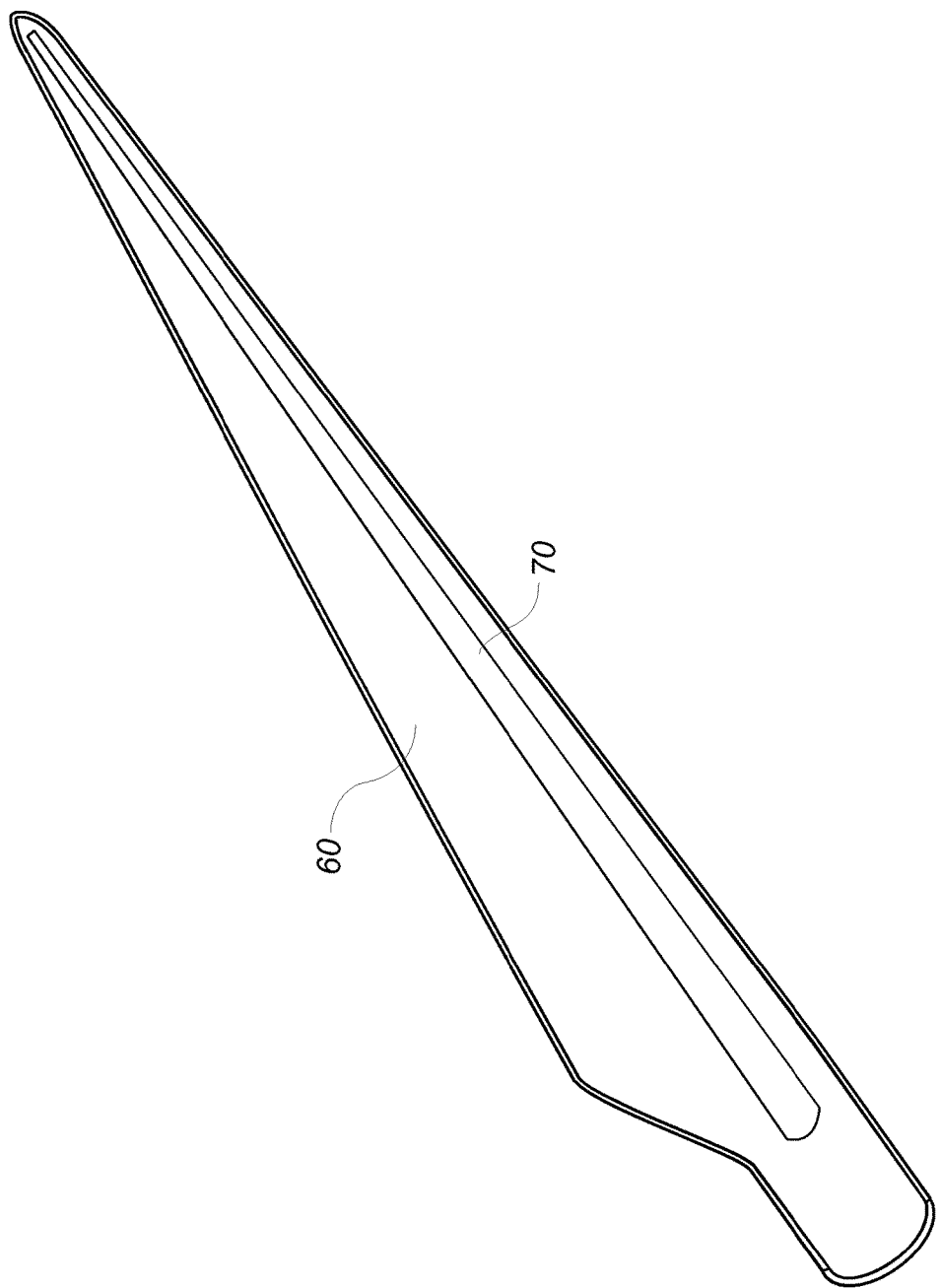

The invention is explained in detail below with reference to an embodiment shown in the drawings, in which FIG. 1 shows a wind turbine, FIG. 2 shows a schematic view of a wind turbine blade according to the invention, FIG. 3 shows the layup of fibre material for forming a cured blade element, FIG. 4 shows the layup of fibre material for forming an integrated reinforced section on the cured blade element of FIG. 3, FIG. 5 shows a cross section of the cured blade element and integrated reinforced section, FIG. 6 shows a schematic view of a blade shell part comprising the cured blade element and integrated reinforced section, FIG. 7 shows a schematic view of a the fibre layup of a first thickness section of a blade component, FIG. 8 shows a schematic view of a the fibre layup of a second thickness section of a blade component, and FIGS. 9a-d show different variations of embodiments according to the invention.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

In the following, the invention is explained with respect to the manufacture of the pressure side shell part 36 or suction side shell part 38.

FIGS. 3 and 4 illustrate the layup process involved in manufacturing a blade shell part of a wind turbine blade and show a part of a longitudinal cross-section of a blade mould.

The process involves the steps of laying up a primary fibre material in a mould 50. The primary fibre material comprises a number of outer skin layers 52, which form an outer part of the blade shell part. The outer skin layers 52 may for instance be made of biaxially oriented glass fibres. A plurality of reinforcement layers 54, preferably made of glass fibres, are arranged on top of the outer skin layers 52. The reinforcement layers 54 are preferably made of unidirectionally arranged glass fibres extending substantially in the longitudinal direction of the blade shell part in order to provide stiffness in the spanwise direction of the finished blade. The ends of the plurality of reinforcement layers are preferably tapered and arranged so as to form a taper section 56. A number of inner skin layers 58 are arranged on top of the reinforcement layers. The inner skin layers may also be made of biaxially oriented glass fibres. The inner skin layers 58 may as shown in FIG. 3 be laid over the ends of the reinforcement layers 54 so that the inner skin layers make up part of the taper section 56.

Subsequently a number of resin inlets (not shown) and vacuum outlets (not shown) are arranged on top of the primary fibre material, and finally a vacuum bag (not shown) is arranged on top. Then the primary fibre material is infused with a primary resin, advantageously a polyester resin, via a VARTM process, and the resin is cured in order to form a cured blade element 60. In the shown embodiment, the outer skin layers 56 form part of the aerodynamic shell of the finished wind turbine blade, whereas the fibre reinforcement layers 54 form part of a root laminate of the wind turbine blade.

In a second step, the fibre material that makes up part of the load carrying structure, e.g. a spar cap, is laid up on the cured blade element 60 as shown in FIG. 4. The second step involves laying up a secondary fibre material on top of at least a portion of the cured blade element 60. The secondary fibre material comprises a number of fibre reinforcement layers 62. The fibre reinforcement layers 62 may advantageously be made of unidirectionally arranged carbon fibres or hybrid mats comprising glass fibres and carbon fibres. Finally a number of additional inner skin layers 64 are arranged on top of the fibre reinforcement layers 62. Subsequently a number of resin inlets (not shown) and vacuum outlets (not shown) are arranged on top of the secondary fibre material, and finally a vacuum bag (not shown) is arranged on top. Then the secondary fibre material is infused with a secondary resin, advantageously a vinylester resin, via a VARTM process, and the resin is cured in order to form an integrated reinforced section 70 on the cured blade element 60. The integrated reinforced section may advantageously make part of the spar, spar cap, or main laminate of the finished wind turbine blade. The secondary resin has a higher strength level than said primary resin.

The ends of the fibre reinforcement layers 62 of the secondary fibre material are also tapered so that a gradual transition is obtained between the reinforcement fibres of the primary fibre material and the reinforcement fibres of the secondary fibre material. Further, a gradual transition is obtained between the primary resin and the secondary resin with higher strength level.

The cured blade element 60 may as shown in FIG. 4 remain in the mould 50 during the second step. However, according to an advantageous embodiment, the cured blade element 60 is removed from said mould 50 and transferred to a secondary support, e.g. a support cradle, where the second step is carried out.

FIG. 5 shows a transverse cross section through the mould in a part of the airfoil region of the finished blade and FIG. 6 shows a perspective view of a blade shell part, which is made up of the cured blade element 60, which comprises an aerodynamic shell part and a root laminate, and the integrated reinforced section 70, which forms a spar cap or main laminate of the blade shell part. It is seen that the cured blade element 60 may also comprise a number of sandwich core material 66 arranged on lateral sides of the integrated reinforced section 70.

It is further seen that a recess may be formed in the cured blade element 60, and that the secondary fibre material may be arranged in said recess. This method provides an advantage over prior art methods, since the less critical step of forming the aerodynamic shell and the more critical part of forming the load carrying structure may be separated. By forming a recess in the aerodynamic shell, the secondary fibre material may more easily be arranged without the fibre layers wrinkling and forming mechanically weak areas. Further, as previously mentioned, the two steps may be performed at different work stations, which means that the two steps can be carried in sequence and the throughput be increased, since it is possible to work on two different blade shell parts simultaneously.

While the two-step manufacturing method provides an advantage over prior art manufacturing methods, it has been found that the scarf joint like transition between the glass fibres and carbon fibres or carbon-glass hybrid may in some circumstances not provide a sufficient strength. Therefore, although not shown in the figures, an over-lamination or local thickening is usually necessary. Further, it is not necessarily advantageous to have a transition between both fibre types and resin types in the same taper section.

Accordingly, the invention also provides a method of manufacturing a wind turbine blade component, in particular a spar cap or main laminate, of a wind turbine blade. The fibre layup process involved in the manufacturing method is illustrated in FIGS. 7 and 8.

The wind turbine blade has a longitudinal direction between a root end and a tip end of the wind turbine blade. As before a spar cap 170 is formed by arranging secondary fibre material in a recess of a cured blade element 160. The method involves a first step shown in FIG. 7 of building up a first thickness section 171 by arranging a number of first fibre layers 173 comprising first type reinforcement fibres, preferably glass fibres, and arranging a number of second fibre layers 174 comprising a second type reinforcement fibres, preferably carbon-glass hybrid mats or carbon fibres. The first fibre layers 173 and the second fibre layers 174 have tapered ends and are arranged so that the first fibre layers 173 along a first common boundary or taper section 175 are tapered towards the first surface 172 of the wind turbine blade component in the longitudinal direction of the blade, and the second fibre layers 174 are tapered towards the second surface 182 of the wind turbine blade component 170 in a direction opposite the longitudinal direction.

Then as shown in FIG. 8, a second thickness section 181 is built up by arranging a number of additional first fibre layers 183 comprising the first type reinforcement fibres, and arranging a number of additional second fibre layers 184 comprising the second type reinforcement fibres. The additional first fibre layers 183 and the additional second fibre layers 184 have tapered ends and are arranged so that the first fibre layers 183 and second additional fibre layers 184 are arranged so that the additional first fibre layers 183 along a second common boundary or second taper section 185 are tapered towards the second surface 182 of the wind turbine blade component 170 in the longitudinal direction, and the additional second fibre layers 184 are tapered towards the first surface 172 of the wind turbine blade component 170 in a direction opposite the longitudinal direction. The first thickness section 171 and the second thickness section are stacked along a common boundary 186. Further, a number of inner skin layers 164 may be arranged on top of the layers comprising first type reinforcement fibres and second type reinforcement fibres.

Subsequently a number of resin inlets (not shown) and vacuum outlets (not shown) are arranged on top of the secondary fibre material, and finally a vacuum bag (not shown) is arranged on top. Then the secondary fibre material comprising the first thickness section 171 and second thickness section 181 is infused with a secondary resin, advantageously a vinylester resin, via a VARTM process, and the resin is cured in order to form the wind turbine blade component 170, which has the first type reinforcement fibres and the second type reinforcement fibres embedded in a common polymer matrix.

Accordingly, it is seen that the gradual transition is provided by a combined double-tapered thickness section 171, 181 with first type reinforcement fibres sandwiched between second type reinforcement fibres or vice versa. Although this increases the complexity of the fibre layup procedure, this embodiment provides a stronger stiffness transition of the wind turbine component between the two fibre types, and further the transition may be shorter than prior art wind turbine components having a single taper section. Further, it is clear that the double-tapering is provided during layup and that the reinforcement material is impregnated with a polymer resin and then cured or hardened so that the two types of reinforcement fibres are embedded in a common polymer matrix.

As before, the first fibre layers and second fibre layers advantageously comprise unidirectionally arranged fibres so as to provide stiffness in the spanwise/longitudinal direction of the blade. The inner skin layers may comprise biaxially oriented glass fibres.

While the shown embodiment has been shown with a double tapered lap like joint with two types of fibres embedded in a common matrix, a strong transition may also be achieved by a double lap joint like transition between the two types of fibres.

Overall, it is seen that the invention provides a wind turbine blade component which has three different types of fibre-resin zones. The first zone may comprise glass fibres embedded in a polyester resin, the second zone comprise glass fibres embedded in a vinylester resin, and the third zone comprise glass-carbon hybrid fibre material or carbon fibres embedded in the vinylester resin.

Figure 9A:
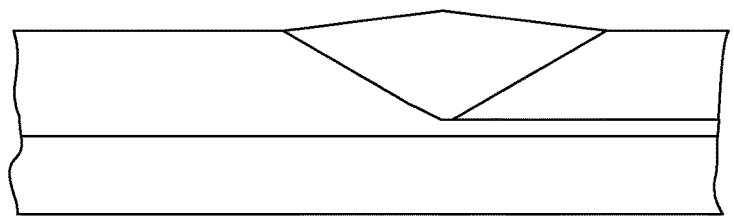
Figure 9B:
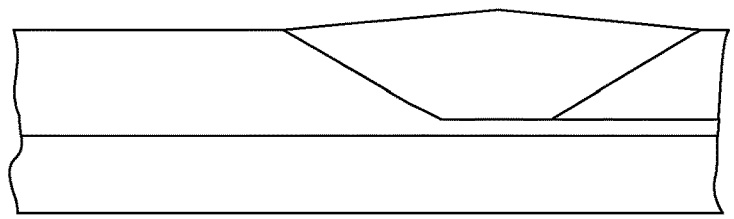
Figure 9C:
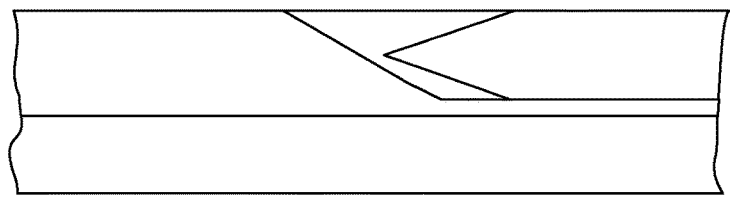
Figure 9D:
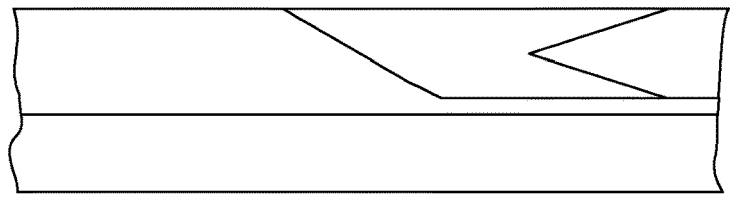

While the preferred embodiment is shown in FIGS. 7 and 8, it is recognised that the above three part transition may be achieved in various ways utilising the afore-mentioned two-step manufacturing method according to the invention. The transitions may for instance be achieved by two single taper sections as shown in FIGS. 9*a* and 9*b*, where FIG. 9*a* shows a "short" transition, and FIG. 9*b* shows a long transition. The preferred embodiment with two tapered thickness sections may also be provided with a "short" transition as shown in FIG. 9*c* or a "long" transition as shown in FIG. 9*d*.

The various taper sections may advantageously be tapered with a 1:5-1:50 thickness-to-length ratio, advantageously around 1:20.

The invention has been described with reference to advantageous embodiments. However, the scope of the invention is not limited to the illustrated embodiments, and alterations and modifications can be carried out without deviating from the scope of the invention.

LIST OF REFERENCE NUMERALS

2 wind turbine
4 tower
6 nacelle
8 hub
10 blade
14 blade tip
16 blade root
18 leading edge
20 trailing edge
22 pitch axis
30 root region
32 transition region
34 airfoil region
36 pressure side shell
38 suction side shell
40 shoulder
50 mould
52 outer skin layers
54 reinforcement layers
56 taper section
58 inner skin layers
60, 160 cured blade element
62 reinforcement layers
64, 164 inner skin layers
66 sandwich core material
70, 170 integrated reinforced section/spar cap/main laminate
171 first thickness section
172 first surface
173 first fibre layers comprising first type reinforcement fibres
174 second fibre layers comprising second type reinforcement fibres
175 first common boundary/first common taper section
181 first thickness section
182 second surface
183 additional first fibre layers comprising first type reinforcement fibres

184 additional second fibre layers comprising second type reinforcement fibres
185 second common boundary/second common taper section
186 common surface boundary

The invention claimed is:

1. A method of manufacturing a portion of a wind turbine blade, the method comprising the steps of:
   laying up a primary fibre material in a mould;
   infusing said primary fibre material with a primary resin;
   substantially curing said primary resin in said primary fibre material to form a cured blade element;
   laying up a secondary fibre material on top of at least a portion of said cured blade element, wherein said cured blade element comprises at least a portion of a wind turbine blade shell;
   infusing said secondary fibre material with a secondary resin different to said primary resin, wherein said secondary resin has a higher strength level than said primary resin; and
   curing said secondary resin in said secondary fibre material to form an integrated reinforced section on said cured blade element, wherein said integrated reinforced section on said cured blade element forms a main laminate section of said wind turbine blade shell.

2. The method according to claim 1, wherein said primary resin comprises a relatively low-strength resin.

3. The method according to claim 1, wherein said secondary resin comprises a relatively high-strength resin.

4. The method according to claim 1, wherein the method comprises the step of, after laying up said primary fibre material, applying a primary vacuum bag over said primary fibre material, and wherein said step of infusing said primary fibre material with a primary resin comprises a vacuum infusion process.

5. The method according to claim 4, wherein the method comprises the step of, after curing said primary resin, removing said primary vacuum bag before laying up said secondary fibre material.

6. The method according to claim 1, wherein the method comprises the step of, after laying up said secondary fibre material, applying a secondary vacuum bag over said secondary fibre material, and wherein said step of infusing said secondary fibre material with a secondary resin comprises a vacuum infusion process.

7. The method according to claim 1, wherein the method comprises the step of treating a surface of said at least a portion of said cured blade element prior to said step of laying up said secondary fibre material, wherein said step of treating acts to increase the bonding between said reinforced section and said cured blade element after said step of curing said secondary resin.

8. The method according to claim 1, wherein said step of laying up said secondary fibre material comprises arranging said secondary fibre material to form a structural flange of said cured blade element, wherein said step of curing said secondary fibre material forms a reinforced structural flange of said cured blade element.

9. The method of manufacturing a portion of a wind turbine blade according to claim 2, wherein the relatively low-strength resin comprises polyester.

10. The method of manufacturing a portion of a wind turbine blade according to claim 3, wherein the relatively high-strength resin is selected from the group consisting of vinylester, epoxy, polyurethane, and a hybrid resin.

11. The method of manufacturing a portion of a wind turbine blade according to claim 8, wherein the structural flange comprises an adhesive flange.

12. A method of manufacturing a wind turbine blade comprising:
   providing a first blade element;
   providing a second blade element, wherein at least one of said first and second blade elements comprises a cured blade element comprising a reinforced section manufactured according to a method of manufacturing comprising the steps of:
      laying up a primary fibre material in a mould;
      infusing said primary fibre material with a primary resin;
      substantially curing said primary resin in said primary fibre material to form the cured blade element;
      laying up a secondary fibre material on top of at least a portion of said cured blade element, wherein said cured blade element comprises at least a portion of a wind turbine blade shell;
      infusing said secondary fibre material with a secondary resin different to said primary resin, wherein said secondary resin has a higher strength level than said primary resin; and
      curing said secondary resin in said secondary fibre material to form an integrated reinforced section on said cured blade element, wherein said integrated reinforced section on said cured blade element forms a main laminate section of said wind turbine blade shell; and
   assembling said first and second blade elements to form a wind turbine blade.

13. A method of manufacturing a portion of a wind turbine blade, the method comprising the steps of:
   laying up a primary fibre material in a mould by arranging said primary fibre material in said mould to define a recess to receive an integrated reinforced section;
   infusing said primary fibre material with a primary resin;
   substantially curing said primary resin in said primary fibre material to form a cured blade element;
   laying up a secondary fibre material on top of at least a portion of said cured blade element by arranging said secondary fibre material in said recess;
   infusing said secondary fibre material with a secondary resin different to said primary resin, wherein said secondary resin has a higher strength level than said primary resin; and
   curing said secondary resin in said secondary fibre material to form the integrated reinforced section on said cured blade element.

14. A method of manufacturing a portion of a wind turbine blade, the method comprising the steps of:
   laying up a primary fibre material in a mould;
   infusing said primary fibre material with a primary resin;
   substantially curing said primary resin in said primary fibre material to form a cured blade element;
   removing said cured blade element from said mould;
   transferring said cured blade element to a secondary support;
   laying up a secondary fibre material on top of at least a portion of said cured blade element;
   infusing said secondary fibre material with a secondary resin different to said primary resin, wherein said secondary resin has a higher strength level than said primary resin; and curing said secondary resin in said secondary fibre material to form an integrated reinforced section on said cured blade element.

\* \* \* \* \*